(12) United States Patent
Lee et al.

(10) Patent No.: US 8,755,202 B2
(45) Date of Patent: Jun. 17, 2014

(54) ELECTRIC GENERATING SYSTEM WITH A CONTROLLER CONTROLLING A SNUBBER DEVICE

(75) Inventors: Tae Won Lee, Suwon-si (KR); Young Ho Kim, Seoul (KR); Yong Hyok Ji, Suwon-si (KR); Doo Young Song, Gwangju (KR); Min Ho Heo, Gwangju (KR); Tae Hoon Kim, Suwon-si (KR); Chung Yuen Won, Gwacheon-si (KR)

(73) Assignees: Samsung Electro-Mechanics Co., Ltd., Gyunggi-Do (KR); Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 87 days.

(21) Appl. No.: 13/365,179

(22) Filed: Feb. 2, 2012

(65) Prior Publication Data

US 2012/0257422 A1  Oct. 11, 2012

(30) Foreign Application Priority Data

Apr. 8, 2011  (KR) .......................... 10-2011-0032781

(51) Int. Cl.
*H02M 3/335* (2006.01)
(52) U.S. Cl.
USPC ..................................... 363/21.12; 363/21.04
(58) Field of Classification Search
USPC ........... 323/906; 363/15, 20, 21.04, 21.12, 34
See application file for complete search history.

(56) References Cited

U.S. PATENT DOCUMENTS

| 8,000,112 B2 * | 8/2011 | Zhang ........................ 363/21.01 |
| 2009/0257254 A1 * | 10/2009 | Leu ................................. 363/40 |

FOREIGN PATENT DOCUMENTS

| JP | 2002-044946 | 2/2002 |
| KR | 1020010110242 | 12/2001 |
| KR | 1020030005785 | 1/2003 |

OTHER PUBLICATIONS

Kim, Chang-Sun, "A Study on the Development of the High Frequency Phase Shift Controlled Multi-Resonant Power Converter".

* cited by examiner

*Primary Examiner* — Adolf Berhane
*Assistant Examiner* — Emily P Pham
(74) *Attorney, Agent, or Firm* — Bracewell & Giuliani LLP; Brad Y. Chin (57) ABSTRACT

Disclosed herein is an electric generating system using a solar cell, including: a DC/DC converter that converts output voltage generated from a solar cell into DC voltage and has a converter switching device; a snubber device that has a snubber switch clamping voltage applied to the converter switching device; and a control device that detects the voltage applied to the converter switching device and controls an operation of the snubber switch according to a detected voltage level applied to the converter switching device, thereby increasing the efficiency of the electric generating system using a solar cell while reducing switching loss and conduction loss.

13 Claims, 5 Drawing Sheets

Converter control signal

FIG. 4B

Current of magnetization inductor

FIG. 4C

Voltage of converter switching device

FIG. 4D

Current of converter switching device

FIG. 4E

Snubber control signal

FIG. 7

ELECTRIC GENERATING SYSTEM WITH A CONTROLLER CONTROLLING A SNUBBER DEVICE

CROSS REFERENCE(S) TO RELATED APPLICATIONS

This application claims the benefit under 35 U.S.C. Section 119 of Korean Patent Application Serial No. 10-2011-0032781, entitled "DC/DC Converter And Electric Generating System Using Solar Cell Having The Same" filed on Apr. 8, 2011, which is hereby incorporated by reference in its entirety into this application.

BACKGROUND OF THE INVENTION

1. Technical Field

The present invention relates to a DC/DC converter and an electric generating system using a solar cell having the same, and more particularly, to a DC/DC converter generating electricity using sunlight and an electric generating system using a solar cell having the same.

2. Description of the Related Art

Recently, as a power demand is suddenly increased, the expansion of power infrastructures has emerged as a very important issue. In the case of the power demand, standby power becomes insufficient due to the sudden increase in power load used at a specific season, a specific time, such that accidents such as power outage may occur.

As a result, in order to prevent the occurrence of the above-mentioned problem, various attempts to expand power infrastructures, limit the use of power, or the like, have been conducted. As one of these attempts, a method of using a photovoltaic cell (PV), which is an infinite clean energy source and be used with a domestic semiconductor technology has been in the limelight.

Meanwhile, an electric generating system using a solar cell includes a plurality of solar cell modules each having power converters mounted on the backs thereof. Each power converter is configured to include a DC/DC converter, a DC/AC converter, and a control device that controls the operation of the converters.

Among others, the DC/DC converter includes a snubber device that clamps voltage spike generated from a switching device. The snubber device is operated during the turn-off of the switching device to reduce voltage applied across the switching device, thereby clamping the voltage spike.

However, since the existing snubber device is operated during a low-voltage period in utility line which the snubber device is not heavily affected by the voltage spike, the switching loss and the conduction loss of the snubber device may be increased.

Therefore, the overall efficiency of the electric generating system using a solar cell may be degraded.

SUMMARY OF THE INVENTION

An object of the present invention is to provide a DC/DC converter controlling the operation of a snubber switch according to a voltage level applied to a converter switching device to reduce switching loss and conduction loss and increase the efficiency of an electric generating system using a solar cell, and an electric generating system using a solar cell having the same.

According to an exemplary embodiment of the present invention, there is provided an electric generating system using a solar cell, including: a DC/DC converter that converts output voltage generated from a solar cell into DC voltage and has a converter switching device; a snubber device that has a snubber switch clamping voltage applied to the converter switching device; a control device that detects the voltage applied to the converter switching device and controls an operation of the snubber switch according to a detected voltage level applied to the converter switching device.

The control device may turn-on the snubber switch when the voltage applied to the converter switching device is higher than a predetermined reference voltage and turn-off the snubber switch when the voltage applied to the converter switching device is not higher than the reference voltage.

The control device may include: a time detector that detects the turn-on time of the snubber switch; and a snubber signal generator that detects the voltage applied to the converter switching device and outputs a snubber control signal controlling the operation of the snubber switch by using the detected voltage applied to the converter switching device and the turn-on time of the snubber switch.

The snubber signal generator may include: a detector that detects the voltage applied to the converter switching device; and an operation controller that compares the voltage applied to the converter switching device with the predetermined reference voltage and outputs the snubber control signal controlling the operation of the snubber switch according to the comparison results, when the snubber switch is in a turn-on operation time.

The detector may detect the voltage applied to the converter switching device by using voltage of a power grid, a maximum current value of the converter switching device, and a current variation value of the converter switching device.

The detector may include: a first calculator that calculates the maximum current value of the converter switching device; and a second calculator that calculates the current variation value of the converter switching device.

The first calculator may use the following [Equation 1] to calculate the maximum current value of the converter switching device.

$$i_{pri,peak} = \frac{2 \cdot n \cdot i_{out,peak}}{\text{Duty}} \quad \text{[Equation 1]}$$

where $i_{pri,peak}$ represents the maximum current value of the converter switching device, n represents a turn ratio of primary and secondary coils of a transformer, $i_{out,peak}$ represents the maximum current value of the output diode, and Duty represents the conduction ratio of the converter switching device.

The second calculator may use the following [Equation 2] to calculate the current variation value of the converter switching device.

$$J_M = \frac{i_{pri,peak} \cdot R_0}{v_{in} + v_{FB}/n} \quad \text{[Equation 2]}$$

where $J_m$ is the current variation value of the converter switching device SW, $R_o$ represents the leakage inductance and equivalent impedance of the capacitor of the converter switching device, $V_{in}$ represents input voltage, and $V_{FB}$ is voltage output from the transformer The detector may use the following [Equation 3] to detect the voltage applied to the converter switching device.

$$v_{sw,spike} = \frac{v_{in} + v_{grid}/n}{1 + J_M}$$ [Equation 3]

where $V_{sw,\,spike}$ represents the voltage applied to the converter switching device SW and $V_{grid}$ is the voltage of the power grid According to another exemplary embodiment of the present invention, there is provided an electric generating system using a solar cell, including: a DC/DC converter that converts output voltage generated from a solar cell into DC voltage and has a converter switching device; a snubber device that has a snubber switch clamping voltage applied to the converter switching device; and a control device that detects a phase of a power grid and controls an operation of the snubber switch according to the detected phase of the grid.

The control device may include: a phase detector that detects the phase of the power grid; a time detector that detects a turn-on time of the snubber switch; a comparator that performs a comparison to determine whether the phase of the power grid is within a predetermined reference phase period, when the snubber switch is in a turn-on operation time; and a snubber signal generator that turns-on the snubber switch, if it is determined that the phase of the power grid is within the reference phase period according to the comparison result.

The snubber signal generator may turn-off the snubber switch when the phase of the power grid is out of the reference phase period.

The reference phase period may be a phase period corresponding to voltage exceeding rated voltage of the converter switching device.

According to another aspect of the present invention, there is provided a DC/DC converter using a switching device to perform DC/DC conversion, including: a transformer that has a secondary coil inducing energy from a primary coil receiving primary current; a snubber circuit that has a snubber switch clamping voltage applied to the switching device; and a snubber controller that controls a turn-on or turn-off operation of the snubber switch according to a voltage level applied to the switching device.

The snubber controller may turn-on the snubber switch when the voltage applied to the switching device is higher than a predetermined reference voltage and turn-off the snubber switch when the voltage applied to the switching device is not higher than the reference voltage.

The snubber circuit may include a snubber capacitor of which one end is connected to the snubber switch and the other end is connected to a drain of the switching device.

The snubber switch may have a drain connected to a positive input end and a source connected to the drain of the switching device.

DESCRIPTION OF THE PREFERRED EMBODIMENTS

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application. Hereinafter, exemplary embodiments of the present invention will be described in detail with reference to the accompanying drawings.

Figure 1:
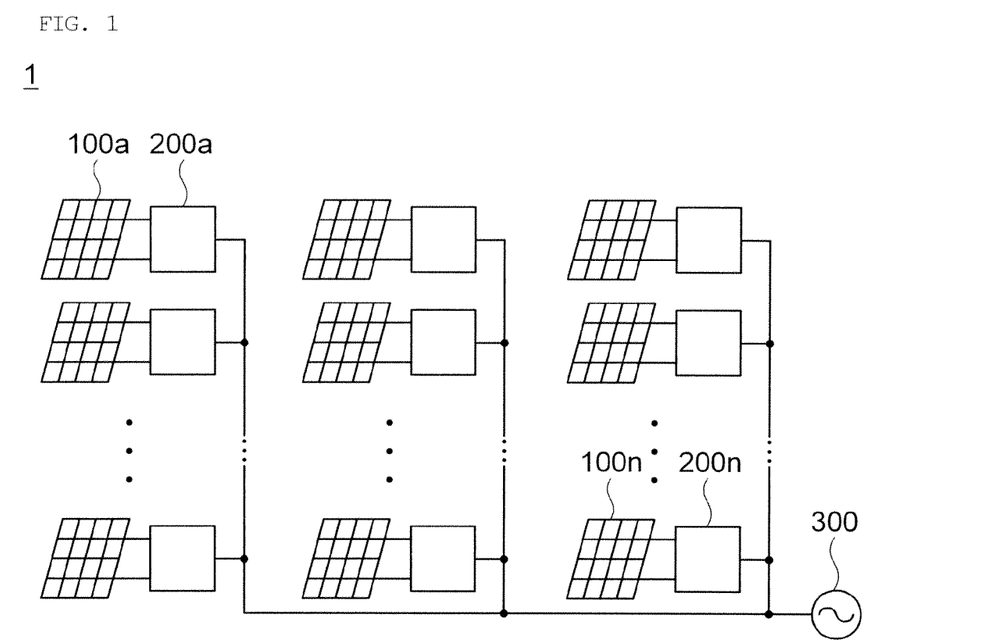
FIG. 1 is an overall configuration diagram of an electric generating system using a solar cell according to an exemplary embodiment of the present invention.

FIG. 1 is an overall configuration diagram of an electric generating system using a solar cell according to an exemplary embodiment of the present invention.

As shown in FIG. 1, an electric generating system 1 using a solar cell is largely configured to include a solar cell 100 (100a to 100n), a power converter 200 (200a to 200n) that converts power generated from the solar cell 100 and applies the converted power to a power grid 300, and a power grid 300.

In this configuration, the solar cell 100 generates effective PV power by performing solar generation and does not generate effective PV power by not performing solar generation, corresponding to the daytime, that is, when sunlight is shining and night, that is, when sunlight disappears, respectively.

As described above, since the solar cell 100 does not constantly perform solar generation according to the presence or absence of sunlight, the solar cell 100 is controlled to generate maximum power through maximum power point tracking (MPPT) that tracks a maximum power point of power generated by the solar cell 100.

Figure 2:
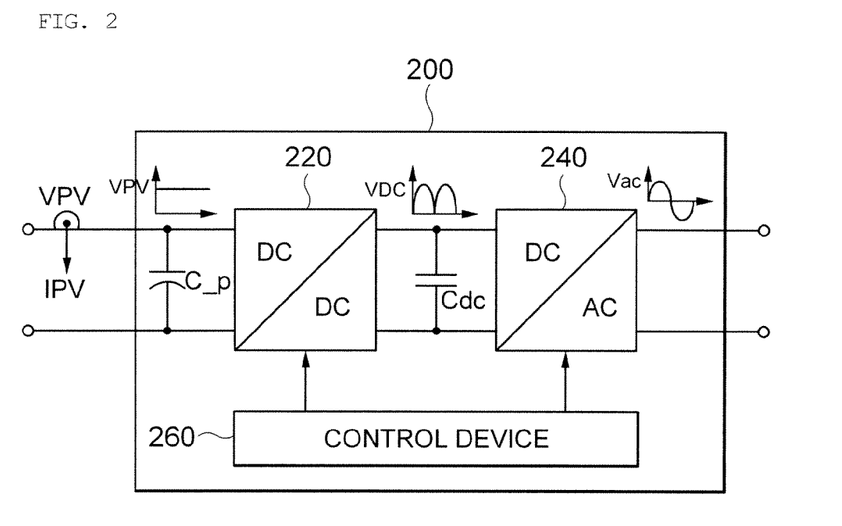
FIG. 2 is a configuration diagram of a power converter shown in FIG. 1.

FIG. 2 shows a configuration diagram of a power converter shown in FIG. 1.

Referring to FIG. 2, the power converter 200 is configured to include a DC/DC converter 220 (hereinafter, referred to as a converter) that converts output voltage VPV generated from the solar cell 100 into DC voltage VDC in a pulse type, a DC/AC converter 240 (hereinafter, referred to as an inverter) that converts the DC voltage VDC in a pulse type into AC voltage Vac and applies the AC voltage to a power grid 300, and a control device 260 that controls the operation of the converter 220 and the inverter 240 based on the output voltage VPV of the solar cell 100, output current IPV of the solar cell 100 and voltage Vgrid of the power grid 300.

The converter 220 is a unit that converts the output voltage VPV generated from the solar cell 100 into DC voltage VDC in a full-wave rectified sine wave type, wherein the DC voltage VDC may have an approximately two-times the frequency of the power grid 300.

As the converter 220, a flyback converter, a buck-boost converter, a push-pull converter, a half-bridge converter, a full-bridge converter, or the like, may be used and a converter of a type deformed based on a converter may also be used.

Figure 3:
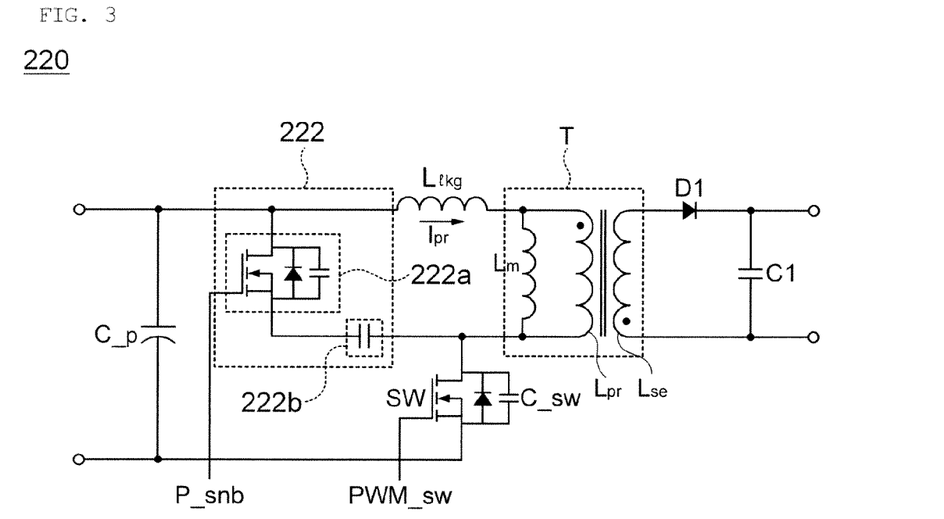
FIG. 3 is a configuration diagram of the converter shown in FIG. 2.

FIG. 3 shows a configuration a converter shown in FIG. 2 and the exemplary embodiment of the present invention will describe the flyback converter as an example.

The flyback converter 220 shown in FIG. 3 is configured to include a converter switching device SW, a transformer T, a snubber device 222, a rectifying diode D1, and an output capacitor C1.

The converter switching device SW is a unit that performs a pulse width modulation operation according to a converter control signal PWM_sw output from the control device 260 and supplies input voltage, primary voltage to a transformer T and is configured as a MOS field-effect transistor (MOSFET), wherein a drain of the MOS field-effect transistor is connected to the transformer T and a source thereof is connected to a ground GND.

The transformer T is a unit that converts the primary voltage into secondary voltage according to a turn ratio of a primary coil Lpr and a secondary coil Lse and includes a magnetization inductor Lm that is equivalently connected to the primary coil Lpr in parallel and represents magnetization of a magnetic core and a leakage inductor L1$lkg$ that is located on a path of the primary current Ipr due to a leakage of magnetic flux of the transformer T.

The snubber device 222 is a unit that clamps the voltage applied across the converter switching device SW2 (that is, drain-source voltage Vds of the converter switching device SW) and includes a snubber switch 222a and a snubber capacitor 222b.

In this configuration, the snubber switch 222a has a drain connected to a positive input end and a source connected to one end of the snubber capacitor 222b and one end of the snubber capacitor 222b is connected to the source of the snubber switch 222a and the other end thereof is connected to the drain of the converter switching device SW.

Further, the snubber switch 222a is turned-on according to a snubber control signal P_snb output from the control device 260 when the converter switching device SW is turned-off to charge the voltage applied across the converter switching device SW in the snubber capacitor 222b, thereby clamping the voltage applied across the converter switching device SW.

FIGS. 4A to 4F show signal waveform diagrams of the converter shown in FIG. 2.

The operation of the snubber device 222 will be described in more detail with reference to FIGS. 4A to 4F.

Figure 4A:
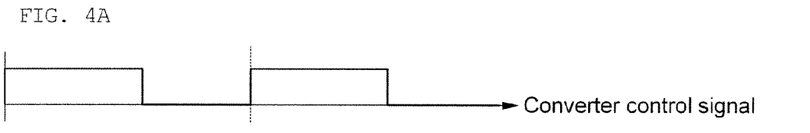
FIGS. 4A to 4F are signal waveform diagrams of the converter shown in FIG. 2.

As shown in FIG. 4A, when the converter switching device SW is turned-on, the voltage applied to the converter switching device SW is equal to the input voltage applied to the flyback converter 220.

Figure 4B:
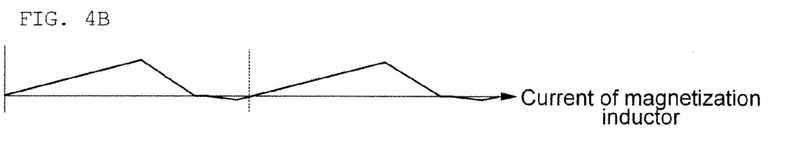

However, when the converter switching device SW is turned-off, the secondary voltage (that is, voltage output from the flyback converter 220) of the transformer T is applied to the magnetization inductor Lm, such that current flows in the magnetization inductor Lm as shown in FIG. 4B.

Figure 4C:
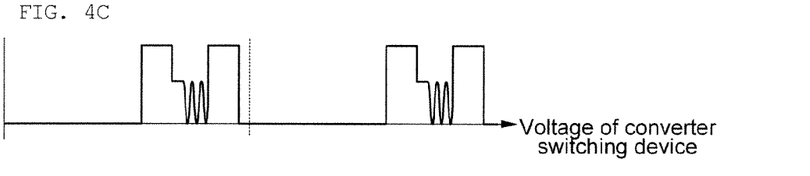
Figure 4D:
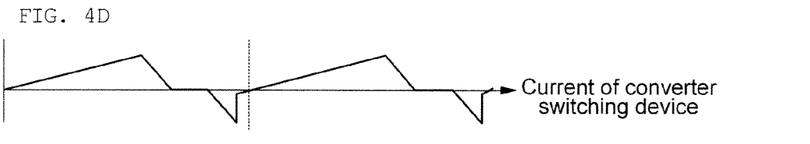

Further, as shown in FIG. 4C, the sum of the input voltage, the voltage of the magnetization inductor Lm, and the voltage spike generated due to the resonance of the leakage inductor L1$lkg$ and a capacitor C_sw of the converter switching device SW is applied across the converting switch SW, such that current flow as shown in FIG. 4D.

Figure 4E:
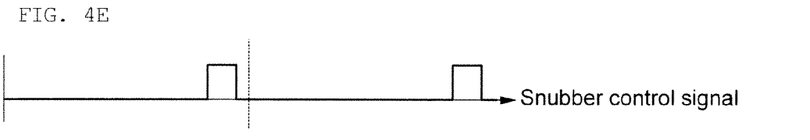

As described above, in order to limit the application of excessive voltage to the converter switching device SW, the snubber switch 222a is turned-on before the predetermined time when the converter switching device SW is turned-off and turned-on, as shown in FIG. 4E.

Figure 4F:
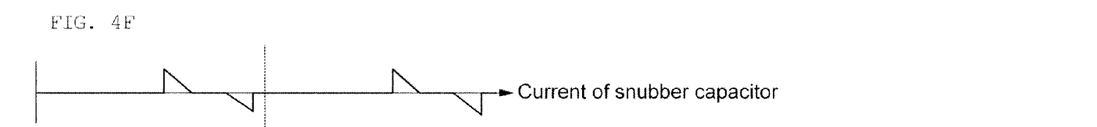

As a result, the energy stored in the leakage inductor L1$lkg$ is charged in the capacitor C_sw of the converter switching device SW and is charged in the snubber capacitor 222b, such that current flows in the snubber capacitor 222b as shown in FIG. 4F, thereby reducing the voltage applied to the converter switching device SW through the process as described above.

The rectifying diode D1 rectifies the secondary voltage from the transformer T and the output capacitor C1 smoothes the voltage through the rectifying diode D1.

Figure 5:
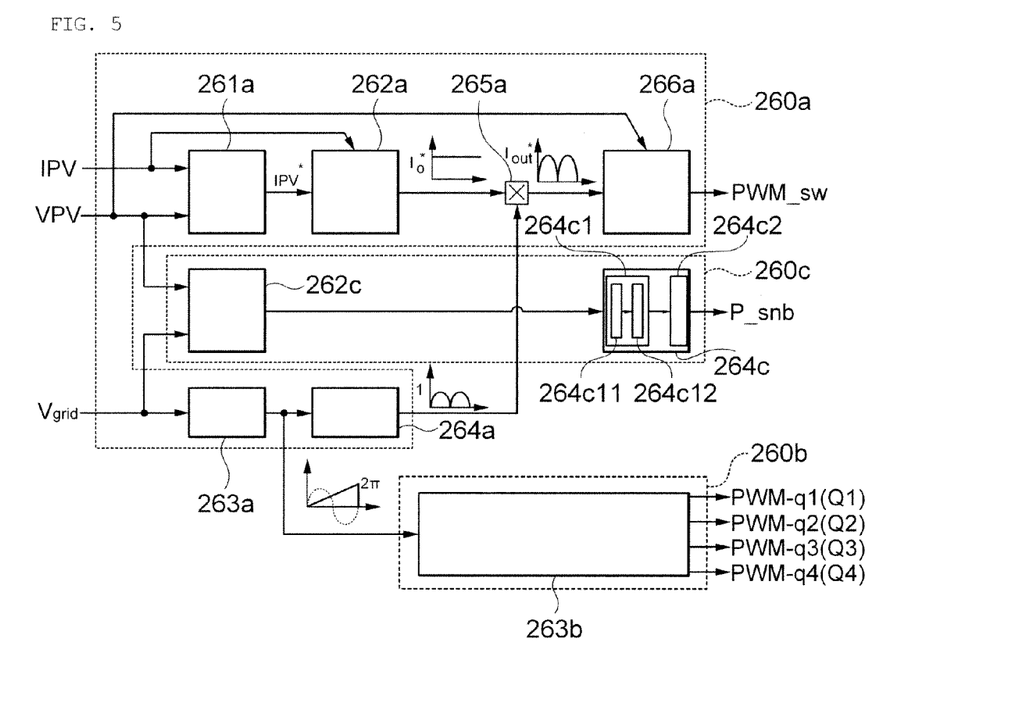
FIG. 5 is a configuration diagram of the control device shown in FIG. 2.

FIG. 5 is a configuration diagram of the control device shown in FIG. 2.

As shown in FIG. 5, the control device 260 is largely configured to include a converter controller 260a that generates and outputs the converter control signal PWM_sw to the converter 220 so as to convert the output voltage VPV generated from the solar cell 100 into the in-phase DC voltage VDC, an inverter controller 260b that generates and outputs inverter control signals PWM_q1 to PWM_q4 to the inverter 240 so as to convert the DC voltage VDC output from the converter 220 into the AC voltage Vac, and a snubber controller 260c that generates and outputs a snubber control signal P_snb so as to clamp the voltage applied to the converter switching device SW.

The converter controller 260a is configured to include an MPPT controller 261a, a current controller 262a, a phase detector 263a, a sine value calculator 264a, a calculator 265a, and a converter signal generator 266a.

In order to maintain the power conversion and the maximum output of the inverter 240, the MPPT controller 261a controls the maximum power point tracking (MPPT) based on the information on the output voltage VPV and the output current IPV of the solar cell 100 to generate and transfer reference current IPV* to the current controller 262a.

The current controller 262a calculates and outputs a DC current instruction value Io* according to the difference value between the output current IPV and the reference current IPV* of the solar cell 100.

The phase detector 263a detects a phase angle of the power grid 300, the sine value calculator 264a amplifies the difference between a predetermined reference frequency and an output frequency of the inverter 240 with a predetermined gain to calculate a frequency difference amplification value and adds the calculated frequency difference amplification value and the phase angle of the power grid 300 detected in the phase detector 263a to output the sine value.

The calculator 265a is configured as a multiplier 265a1, which multiplies the sine value output from the sine value calculator 264a by the DC current instruction value Io* output from the current controller 262a to output a current instruction value Iout*.

The converter signal generator 266a uses the output current instruction value Iout* to generate and output the converter control signal PWM_sw.

The inverter signal generator 263b generates and outputs the first to fourth inverter control signals PWM_q1 to PWM_q4 so as to control first to fourth inverter switching devices Q1 to Q4.

The snubber controller 260c is a unit that controls the operation of the snubber switch 222a according to the voltage level applied to the converter switching device SW and includes a time detector 262c and a snubber signal generator 264c.

The time detector 262c uses voltage $V_{grid}$ of the power grid 300 and the voltage VPV generated from the solar cell 100 to detect the turn-on time (that is, the operation condition of the snubber switch 222a) of the snubber switch 222a.

Described in more detail, the magnitude in voltage applied across the converter switching device SW may be determined by using an instantaneous value of the voltage $V_{grid}$ of the power grid 300 and the voltage VPV generated from the solar cell 100 and the operation conditions of the snubber switch 222a may be detected by using the determined magnitude in voltage.

That is, since the snubber switch 222a is turned-on in a period before the predetermined time when the converter switching device SW is turned-off and turned-on, the snubber switch 222a may use the turn-on time or the turn-off time of the converter switching device SW to detect the time when the snubbed switch 222a is turned-on.

The snubbed signal generator 264c is a unit that uses the turned-on time of the snubbed switch 222a detected in the time detector 262c and the voltage applied across the converter switching device SW to control the turn-on or turn-off of the snubber switch 222a and is configured to include a detector 264c1 and an operation controller 264c2.

The detector 264c1 uses the voltage $V_{grid}$ of the power grid 300, a maximum current value $i_{pri,\,peak}$ of the converter switching device SW and a current variation value $J_m$ of the converter switching device SW to detect the voltage Vds applied to the converter switching device SW.

To this end, the detector 264c1 includes first and second calculators 264c11 and 264c12 that calculate the maximum current value $i_{pri,\,peak}$ of the converter switching device SW and the current variation value $J_m$ of the converter switching device SW, respectively.

First, the first calculator 264c11 uses the following [Equation 1] to calculate the maximum current value $i_{pri,\,peak}$ of the converter switching device SW.

$$i_{pri,peak} = \frac{2 \cdot n \cdot i_{out,peak}}{\text{Duty}} \quad \text{[Equation 1]}$$

Where $i_{pri,peak}$ represents the maximum current value of the converter switching device, n represents the turn ratio of the primary and secondary coils of the transformer, $i_{out,peak}$ represents the maximum current value of the output diode, and Duty represents the conduction ratio of the converter switching device.

The second calculator 264c12 uses the following [Equation 2] to calculate the current variation value $J_m$ of the converter switching device SW.

$$J_M = \frac{i_{pri,peak} \cdot R_0}{v_{in} + v_{FB}/n} \quad \text{[Equation 2]}$$

Where $J_m$ is the current variation value of the converter switching device SW, $P_o$ represents the leakage inductance and the equivalent impedance of the capacitor of the converter switching device, $V_{in}$ represents the input voltage, and $V_{FB}$ is the voltage output from the transformer.

After the maximum current value $i_{pri,\,peak}$ of the converter switching device SW and the current variation value $J_m$ of the converter switching device SW are calculated through the above [Equation 1] and [Equation 2], the detector 262c1 uses the following [Equation 3] to detect the voltage Vds applied to the converter switching device SW.

$$v_{sw,spike} = \frac{v_{in} + v_{grid}/n}{1 + J_M} \quad \text{[Equation 3]}$$

Where $V_{sw,\,spike}$ represents the voltage applied to the converter switching device SW and $V_{grid}$ is the voltage of the power grid.

The operation controller 264c2 compares the voltage Vds applied to the converter switching device SW with the reference voltage Vref and outputs the snubber control signal P_snb controlling the operation of the snubber switch 222a according to the comparison results and the turn-on time detected in the time detector 262c.

That is, the operation controller 264c2 uses the time detector 262c to determine whether the snubber switch 222a is the turn-on operation time and compares the voltage Vds applied to the converter switching device SW with the reference voltage Vref for the time when the snubber switch 222a is turned-on to output the snubber control signal P_snb controlling the operation of the snubber switch 222a according to the comparison results.

Figure 6A:
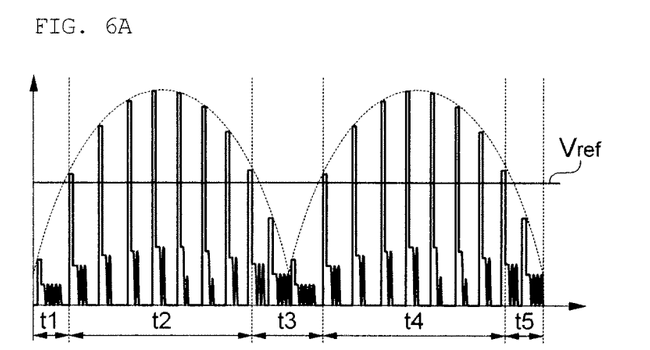
FIGS. 6A and 6B are voltage waveform diagrams of the converter according to the non-use of the snubber device or the use of the general snubber device.
Figure 6B:
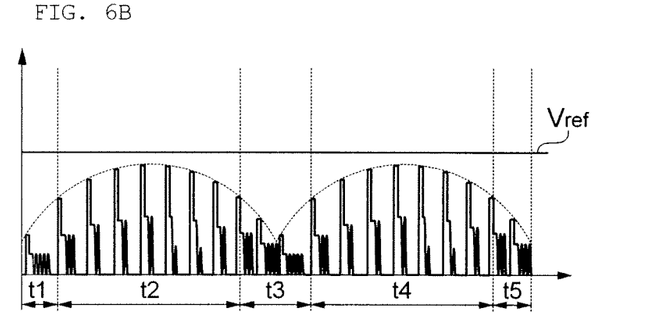
Figure 6C:
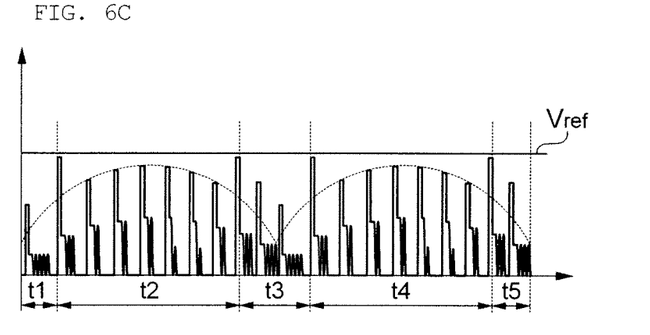
FIG. 6C is a voltage waveform diagram of the converter according to the use of the snubber device according to the exemplary embodiment of the present invention.

FIGS. 6A and 6B show voltage waveform diagrams of the converter according to the non-use of the snubber device or the use of the general snubber device and FIG. 6C shows a voltage waveform diagram of the converter according to the use of the snubber device according to the exemplary embodiment of the present invention. The exemplary embodiment of the present invention will be described in detail with reference to FIGS. 6A to 6C.

As shown in FIG. 6A, when the voltage applied to the converter switching device SW is higher than the reference voltage Vref (rated voltage) in a high-voltage period (t2 and t4 period) in a grid frequency when the snubber device is not used, the converter switching device SW may not be operated.

Therefore, in order to solve the above problems, as shown in FIG. 6B, the voltage applied to the converter switching device SW in the overall area in the grid frequency is controlled to be lower than the reference voltage Vref by using the general snubber device, but the efficiency may be degraded due to the loss of the snubber switch 222a since the snubber switch 222a is operated over the overall period (t1 to t5 period) in the grid frequency.

Therefore, in order to solve the problems of FIG. 6A and the problem of the efficiency degradation of FIG. 6B, as shown in FIG. 6C, the exemplary embodiment of the present invention outputs the snubber control signal P_snb that turns-off the snubber switch 222a only in the low-voltage period (t1, t3, and t5 period) in the grid frequency where the voltage applied to the converter switching device SW is lower than the reference voltage and the high-frequency period (t2 and t4 period) in the grid frequency where the voltage applied to the converter switching device SW is higher than the reference voltage to operate the converter switching device SW in the overall period in the grid frequency and does not operate the snubber switch 222a in the low-voltage period (t1, t3, and t5 period) in the grid frequency to improve the switching loss and the conduction loss of the snubber switch 222a generated for the above period.

Figure 7:
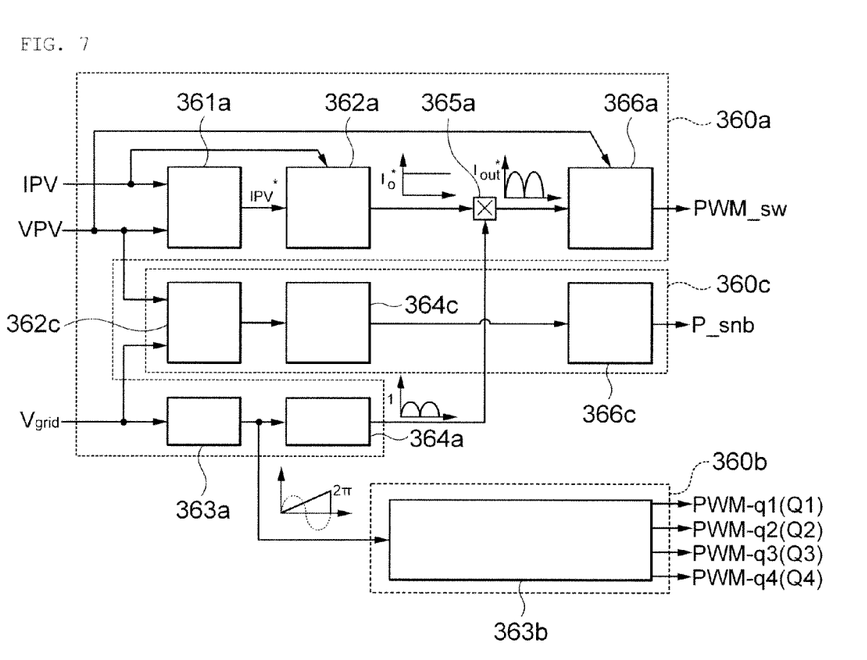
FIG. 7 is a configuration diagram of a proposed control device according to another exemplary embodiment of the present invention.

FIG. 7 shows a configuration diagram of a proposed control device according to another exemplary embodiment of the present invention. As shown in FIG. 7, the snubber controller 360c includes a phase detector 363a, a time detector 362c, a comparator 364c, and a snubber signal generator 336c.

In this configuration, the description of the same components as the above-mentioned components will be omitted.

The phase angle of the power grid 300 is detected by the phase detector 363*a*.

The time detector 362*c* uses voltage $V_{grid}$ of the power grid 300 and the voltage VPV generated from the solar cell 100 to detect the turn-on time of the snubber switch 222*a*.

Described in more detail, since the snubber switch 222*a* is turned-on in the period before the predetermined time when the converter switching device SW is turned-off and turned-on, the snubber switch 222*a* may use the turn-on time or the turn-off time of the converter switching device SW to detect the time when the snubber switch 222*a* is turned-on.

The comparator 364*c* performs a comparison to determine whether the phase of the power grid 300 is in the predetermined reference phase period.

The snubber signal generator 366*c* generates and outputs the snubber control signal P_snb that turns-on the snubber switch 222*a* when the phase of the power grid 300 is in the predetermined reference phase period and turns-off the snubber switch 222*a* when the phase of the power grid 300 is out of the predetermined reference phase period, according to when the snubber switch 222*a* is in a turn-on operation time and the comparison results of the comparator 364*c*.

As set forth above, the DC/DC converter and the electric generating system using a solar cell having the same control the operation of the snubber switch according to the voltage level applied to the converter switching device, thereby reducing the switching loss and the conduction loss.

That is, the snubber switch is turned-on when the voltage applied to the converter switching device is higher than the reference voltage and the snubber switch is turned-off when the voltage applied to the converter switching device is not higher than the reference voltage, thereby reducing the switching loss and the conduction loss.

In addition, the DC/DC converter and the electric generating system using a solar cell having the same controls the operation of the snubber switch according to the above-mentioned method, thereby reducing the voltage stress applied across the converter switching device.

Further, the switching loss and the conduction loss of the electric generation system using a solar cell may be easily reduced without the separate detector or the sensor.

Therefore, the overall efficiency of the electric generating system using a solar cell may be increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. An electric generating system using a solar cell, comprising:
    a) a converter converting voltage generated by a solar cell into a rectified AC voltage, said converter including a snubber device that has a snubber switch to clamp a voltage applied to a converter switching device;
    b) a control device detecting the voltage applied to the converter switching device outputting a snubber control signal controlling the snubber switch, wherein the control device includes:
        b1) a time detector detecting a turn-on time of the snubber switch; and
        b2) a snubber signal generator detecting the voltage applied to the converter switching device and outputting the snubber control signal using the detected voltage and the turn-on time;
    c) an inverter converting the rectified AC voltage to an AC voltage.

2. The electric generating system using a solar cell according to claim 1, wherein the snubber signal generator includes:
    a detector detecting the voltage; and
    an operation controller comparing the voltage with a predetermined reference voltage and outputting the snubber control signal according to a comparison result, when the snubber switch is in a turn-on operation time.

3. The electric generating system using a solar cell according to claim 2, wherein the detector detects the voltage by using another voltage of a power grid, a maximum current value of the converter switching device, and a current variation value of the converter switching device.

4. The electric generating system using a solar cell according to claim 3, wherein the detector includes:
    a first calculator that calculates the maximum current value of the converter switching device; and
    a second calculator that calculates the current variation value of the converter switching device.

5. The electric generating system using a solar cell according to claim 4, wherein the first calculator uses the following [Equation 1] to calculate the maximum current value of the converter switching device $$i_{pri,peak} = \frac{2 \cdot n \cdot i_{out,peak}}{\text{Duty}} \qquad \text{[Equation 1]}$$

where, $i_{pri,peak}$ represents the maximum current value of the converter switching device, n represents a turn ratio of primary and secondary coils of a transformer, $i_{out,peak}$ represents the maximum current value of the output diode, and Duty represents the conduction ratio of the converter switching device.

6. The electric generating system using a solar cell according to claim 4 or 5, wherein the second calculator uses the following [Equation 2] to calculate the current variation value of the converter switching device $$J_M = \frac{i_{pri,peak} \cdot R_0}{v_{in} + v_{FB}/n} \qquad \text{[Equation 2]}$$

$J_M$ is the current variation value of the converter switching device SW, $R_o$ represents the leakage inductance and equivalent impedance of the capacitor of the converter switching device, $V_{in}$, represents input voltage, and $V_{FB}$ is voltage output from the transformer.

7. The electric generating system using a solar cell according to claim 6, wherein the detector uses the following [Equation 3] to detect the voltage applied to the converter switching device $$v_{sw,spike} = \frac{v_{in} + v_{grid}/n}{1 + J_M} \qquad \text{[Equation 3]}$$

$v_{sw,spike}$ represents the voltage applied to the converter switching device SW and $V_{grid}$ is the voltage of the power grid.

8. An electric generating system using a solar cell, comprising:
- a DC/DC converter that converts output voltage generated from a solar cell into DC voltage and has a converter switching device;
- a snubber device that has a snubber switch clamping voltage applied to the converter switching device; and
- a control device that detects a phase of a power grid and controls an operation of the snubber switch according to the detected phase of the grid,
- wherein the control device includes:
  - a phase detector that detects the phase of the power grid;
  - a time detector that detects a turn-on time of the snubber switch;
  - a comparator that performs a comparison to determine whether the phase of the power grid is within a predetermined reference phase period, when the snubber switch is in a turn-on operation time; and
  - a snubber signal generator that turns-on the snubber switch, if it is determine that the phase of the power grid is within the reference phase period according to the comparison result.

9. The electric generating system using a solar cell according to claim 8, wherein the snubber signal generator turns-off the snubber switch when the phase of the power grid is out of the reference phase period.

10. The electric generating system using a solar cell according to claim 8, wherein the reference phase period is a phase period corresponding to voltage exceeding rated voltage of the converter switching device.

11. A DC/DC converter using a switching device to perform DC/DC conversion, comprising:
- a transformer having a secondary coil inducing energy from a primary coil receiving a primary current;
- a snubber circuit having a snubber switch to clamp a voltage applied to the switching device; and
- a snubber controller controlling a turn-on or turn-off operation of the snubber switch according to a level of the voltage, wherein the snubber controller turns-on the snubber switch when the voltage is higher than a predetermined reference voltage and turns-off the snubber switch when the voltage is not higher than the predetermined reference voltage.

12. The DC/DC converter according to claim 11, wherein the snubber circuit includes a snubber capacitor of which one end is connected to the snubber switch and the other end is connected to a drain of the switching device.

13. The DC/DC converter according to claim 11, wherein the snubber switch has a drain connected to a positive input end and a source connected to the drain of the switching device.

* * * * *